Figure 4:
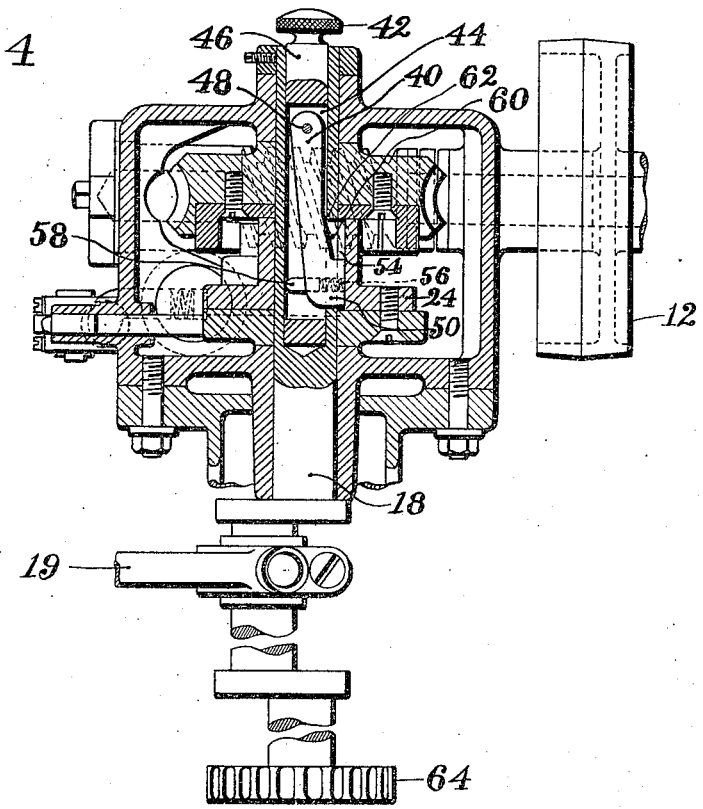

Sept. 16, 1924.                                                1,508,386
E. ERICKSON
DRIVING MECHANISM FOR POWER OPERATED MACHINES
Original Filed April 15, 1918    2 Sheets-Sheet 1
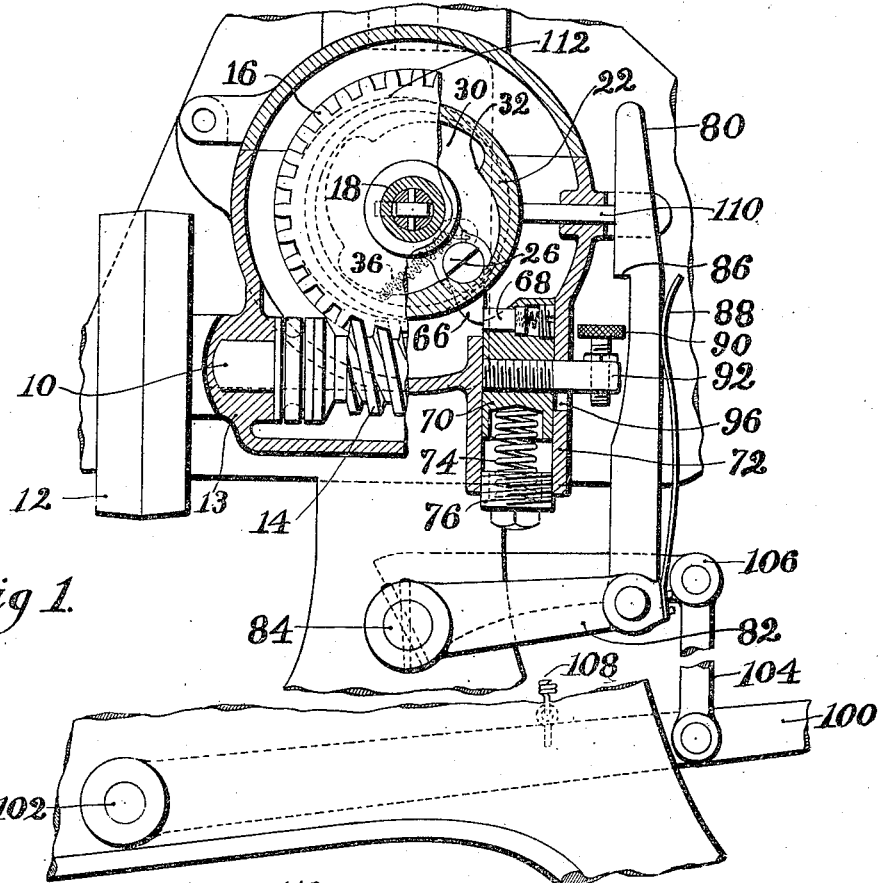
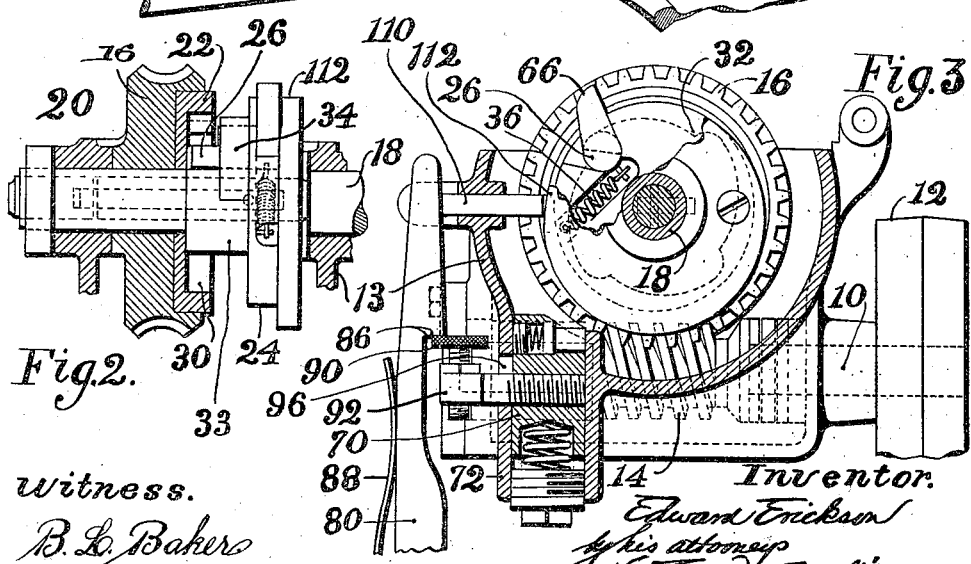
Witness.
B. L. Baker
Inventor.
Edward Erickson
by his attorney Sept. 16, 1924.  
E. ERICKSON  
1,508,386  
DRIVING MECHANISM FOR POWER OPERATED MACHINES  
Original Filed April 15, 1918  2 Sheets-Sheet 2

Witness.  
B. L. Bakers

Inventor.  
Edward Erickson  
by his attorneys

Patented Sept. 16, 1924.

1,508,386

UNITED STATES PATENT OFFICE.

EDWARD ERICKSON, OF BEVERLY, MASSACHUSETTS, ASSIGNOR TO UNITED SHOE MACHINERY CORPORATION, OF PATERSON, NEW JERSEY, A CORPORATION OF NEW JERSEY.

DRIVING MECHANISM FOR POWER-OPERATED MACHINES.

Original application filed April 15, 1918, Serial No. 228,544. Divided and this application filed February 26, 1919. Serial No. 279,351.

*To all whom it may concern:*

Be it known that I, EDWARD ERICKSON, a citizen of the United States, residing at Beverly, in the county of Essex and State of Massachusetts, have invented certain new and useful Improvements in Driving Mechanisms for Power-Operated Machines; and I do hereby declare the following to be a full, clear, and exact description of the invention, such as will enable others skilled in the art to which it appertains to make and use the same.

This invention relates to driving mechanisms for power operated machines, and more particularly to such mechanisms embodying a clutch for connecting the machine to the source of power and for automatically disconnecting the machine therefrom after a single cycle of the operation of the machine.

One of the objects of the invention is to provide an improved driving mechanism of this type that shall be simple, compact and durable in construction, and effective and reliable in operation.

One of the features of the invention resides in an improved form of one revolution clutch comprising cooperating relatively movable parts that are mounted upon the driving shaft of the machine. As illustrated, one of the parts is loosely mounted thereon and is provided with a recess having a peripheral wall provided with a plurality of shoulders, and the other clutch part is normally fixed to the shaft and is provided with a rotatable member having one end extending into said recess. Under the control of the operator, the rotatable member may be actuated to engage one of the shoulders of the loose part of the clutch whereby the component clutch parts are connected to drive the shaft and the machine, said clutch parts remaining connected until a single revolution of the clutch and cycle of operation of the machine is completed, when they are automatically disconnected to discontinue the supply of power to the driving shaft.

Another object of the invention is to provide a driving mechanism of the above indicated class in which the clutch may be rendered inoperative to permit the machine which is driven by the driving shaft to be turned over by hand.

To this end, another feature of the invention resides in connecting the normally fixed clutch part to the driving shaft by means which may manually be withdrawn from operative position to disconnect the normally fixed clutch part, whereby the shaft and the machine associated therewith, may be rendered entirely free of the clutch so that they may be turned over by hand, irrespective of the condition and relative positions of the parts of the clutch.

Figure 5:
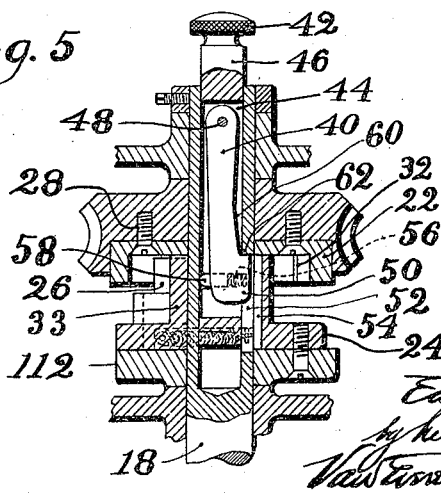

These and other objects of the invention and features by which they are attained, will become apparent to those skilled in the art from the following description and accompanying drawings of the preferred embodiment of the invention, in which:

Figure 1 is a view, partially in vertical section and partially in side elevation, of a driving mechanism constructed in accordance with the present invention; Fig. 2 is a detail view, in front elevation of the clutch, certain parts being shown in vertical section for the sake of clearness; Fig. 3 is a view, partially in side elevation and partially in section, of the driving mechanism; Fig. 4 is a view in horizontal section of the driving mechanism, showing a portion of a machine to which it is applied and illustrating the normally fixed clutch part connected to the shaft in operative position; and Fig. 5 is a horizontal sectional view similar to that of Fig. 4 and showing the normally fixed clutch part disconnected from the shaft to permit the shaft to be turned over by hand.

This application is a division of applicant's copending application Serial No. 228,544, filed April 15, 1918, which relates to a welt-butting machine, and while the present invention is particularly adapted for use in connection with a machine of this type, it is equally applicable to various other machines.

In the preferred embodiment of the invention illustrated in the drawings, the driving mechanism is provided with a power shaft 10 (Figs. 1 and 3) to which power is continuously supplied from a suitable source by means of a pulley 12 carried thereby. The power shaft 10 is journaled in a casing 13 that encloses and supports the driving mechanism and said shaft is provided with a worm 14 that cooperatively engages a worm-gear 16 which is loosely mounted upon a shaft 18 that is journaled in the casing and extends transversely of the shaft 10. This shaft 18 is the main driving shaft of the machine to which the operating mechanism 19 of the machine is connected and by means of which the operating mechanism is actuated through its cycle of operations. The operating mechanism of the machine forms no material part of the present invention and is merely partially indicated and need not be described. The shaft 18 and therefore the operating mechanism is normally idle, and may be connected to the continuously driven worm-gear 16 by means of a clutch 20, whereby its actuation is effected.

The clutch 20 is preferably of the rotation key type and comprises two cooperating relatively movable members 22 and 24 and a rotatable key or pin 26, by means of which said members are connected and disconnected. The clutch member 22 comprises a disk that is rigidly secured to the worm-gear 16 by screws 28 and is provided with a recess 30 having a plurality of shoulders 32 for a purpose to be set forth. The clutch member 24 constitutes a disk having an integral hub 33 which surrounds and is detachably connected to the shaft 18 and which is provided with a boss 34 having a longitudinal recess to receive the rotatable key 26.

One half of the outer extremity of this key is cut away to provide a semi-cylindrical projecting portion. Said key is normally biased or held in the position shown in Fig. 3 by means of a coiled spring 36 that is disposed within a recess in the clutch member 24, one end being attached to said part and the other end to a pin that projects laterally from the rotatable key 26. With the rotatable clutch key 26 held in the position shown in Fig. 3, the semi-cylindrical projecting portion thereof is maintained in such a position as to engage one of the shoulders 32 of the rotating clutch disk 22, whereby the two cooperating clutch members 22 and 24 are rigidly connected together so that the continuous rotation of the worm-gear 16 is transmitted to the clutch member 24.

In order to permit the operating mechanism 19 of the machine to be turned over by hand if desired, manually operable means is provided for rendering the operation of the clutch 20 ineffective. This means comprises a longitudinally movable key 40 (Figs. 4 and 5) that is disposed within a recess in the left-hand end of the shaft 18, and is associated with a knob 42 at the end of the shaft by means of which the key 40 may be manually moved into and out of operative position. The key 40 is disposed within a longitudinal slot 44 in a cylindrical member 46 that is slidably positioned within the hollow end of the shaft 18, and said key is pivotally mounted between the opposite sides of said member upon a pin 48. The inner end of the longitudinally movable key 40 is provided with a projecting portion or spline 50 that is adapted to project through a slot 52 in the side of the hollow shaft 18 and into a keyway 54 in the hub 33 of the clutch member 24, whereby the clutch member 24 is rigidly connected to the shaft 18. A spring 56 is disposed within a recess in the longitudinally movable key 40 and acts against a pin 58 that engages the inner wall of the hollow shaft 18 to force the key outwardly to establish the connection just referred to, whenever the key 40 is pushed into its operative position. With the longitudinally movable key 40 in its operative position, the clutch member 24 is positively keyed to the shaft 18, so that under such conditions, if one of the shoulders 32 of the clutch member 22 is rotated into engagement with the rotatable clutch key 26, the normally idle shaft 18 is thereby connected to the continuously operated worm-gear 16 and is therefore rotated accordingly to effect the operation of the machine to which the driving mechanism is applied.

Assuming the longitudinally movable key 40 to occupy its operative position to connect the clutch member 24 to the shaft 18, as shown in Fig. 4, the disconnection of said members may be effected by pulling out the knob 42, which causes an inclined cam surface 60 on the key 40 to ride over the edge 62 of the slot 52, whereby the key is forced inwardly and out of engagement with the keyway in the clutch member 24. The shaft 18 may therefore be rotated by hand through the agency of a hand wheel 64 that is attached to the opposite end thereof. Moreover, this freedom of operation of the shaft 18 obtains, even though the clutch 20 proper is thrown in, as will be understood.

In the operation of certain types of machines, it is desirable to provide means for interrupting the operation thereof after each cycle of operation has been completed, and therefore the clutch 20 is provided with means for effecting its disconnection after each revolution thereof. In order to accomplish this end, the rotatable clutch key 26 is provided with a dog 66 which normally projects outwardly through a recess in the clutch member 24 into the position shown in Fig. 3.

Assuming the cooperating members of the clutch 20 to be connected and rotated in a clockwise direction, as viewed in Fig. 3, the operating mechanism 19 driven by the shaft 18 is actuated until the dog 66 is brought into engagement with the end of a spring-cushioned pin 68 which is carried by a stop 70, the latter being vertically movable in a sleeve 72 that forms a part of the clutch casing. The stop 70 is normally maintained in its upper position by means of a spring 74 which is seated upon an adjustable nut 76 by means of which the tension of the spring may be varied at will. As the dog 66 is brought into engagement with the spring-cushioned pin 68, said pin yields slightly to relieve the shock at the moment of impact, and forces the dog to its other position, as shown in Fig. 1, during which action the spring 36 is overcome. Thus, the semi-cylindrical projecting portion of the rotatable clutch key 26 is rotated out of contact with the shoulder 32 with which it is engaged, thereby permitting relative movement between the cooperating clutch members 22 and 24. The clutch 20 is thus disengaged, and the shaft 18 and operating mechanism 19 is disconnected from the source of power, the relative position of the parts being as shown in Fig. 1.

The clutch 20 is thrown in by means associated with a treadle mechanism, and such means comprises a stop-releasing finger 80 (Fig. 1) which is pivotally attached to an arm 82, that is fixed on a rock-shaft 84 journaled in a suitable bearing in the frame of the driving mechanism. This finger is provided with a latch 86 which, by means of a spring 88, is normally maintained in position to be brought into engagement with an adjustable screw 90 that is carried by a pin 92, the latter being secured to the movable stop 70 and projecting through a slot 96 in the sleeve 72.

The treadle mechanism comprises a treadle 100 pivotally mounted on a suitably supported stud 102 and connected by a treadle rod 104 to an arm 106 secured to the rock-shaft 84. The treadle is normally held in its raised position by means of a spring 108 that is connected to the frame of the driving mechanism.

As the treadle mechanism is depressed, the rock-shaft 84 which is pinned to the arm 106 is rotated to cause the arm 82 that supports the stop-finger 80 to lower said stop-finger until the latch 86 thereof is brought into engagement with the adjustable screw 90. The continued lowering of the stop-finger 80 effects the depression of the stop 70 until the spring-cushioned pin 68 carried thereby is disengaged from the dog 66 which controls the operation of the rotatable clutch key 26. Thereupon, the spring 36 rotates the clutch key 26 to cause its semi-cylindrical projecting end to be brought into the path of and to be engaged by one of the shoulders 32 of the rotating clutch member 22. Thus, the clutch 20 is thrown in to connect the normally idle shaft 18 and operating mechanism 19 to the source of power.

Since it is desirable to interrupt the operation of the machine at the end of each cycle, it is requisite to provide means for permitting the stop 70 to be raised into its normal position after the dog 66 has been disengaged, irrespective of the position of the treadle mechanism, in order that said stop may again function to engage said dog and disconnect the clutch as soon as a single revolution thereof has been completed. Means is therefore provided to release the latch 86 of the stop-finger 80 from the adjustable screw 90 immediately after the stop 70 has been withdrawn, and this means comprises a pin 110 that is slidable through the clutch casing 13, the outer end of the pin having a sliding engagement with the upper end of the stop-finger 80, and the inner end thereof having a similar engagement with an eccentric 112 that is secured to the clutch member 24. The eccentric 112 temporarily forces the pin 110 outwardly to release the latch 86 at the proper time, as will be readily understood.

Having released the stop-finger 80 to permit the stop 70 to assume its operative position, said finger becomes inoperative until again restored by the treadle spring 108, to its initial position in which the latch 86 is above the adjustable screw 90. When the finger 80 is thus restored to position, the driving mechanism is in readiness to repeat the cycle of operations.

From the foregoing description, it is evident that, were it not for the longitudinally movable key 40 which can be manually operated, it would be impossible to turn the machine over slowly by hand, for the reason that in the inoperative position of the rotatable key 26, its dog 66 engages the stop-pin 68 and prevents movement of the shaft 18, while if the rotatable clutch key 26 occupies its operative position, the rotating part of the clutch is at once connected to its relatively stationary cooperating clutch part whereby the operating mechanism of the machine is power driven.

By the use of the longitudinally movable key 40, however, the clutch part 24 that is normally fixed to the driving shaft 18, may be manually released therefrom so that the driving shaft 18 and operating mechanism 19 is entirely free of the clutch and may be turned over by hand without regard to the condition of the clutch itself.

While it is preferred to employ the construction and arrangement of parts shown and described, it will be understood that this construction and arrangement is not essential except so far as specified in the appended claims.

What is claimed as new is:—

1. The combination with a normally idle shaft and a source of power, of a clutch between said shaft and said source of power comprising cooperating parts, one of which is fixedly associated with the source of power, manually controlled means movable toward the other part for connecting it to the shaft and movable in the opposite direction for disconnecting it, and means under the control of the operator for connecting and disconnecting the clutch parts.

2. The combination with a driving member and a driven member, of a clutch comprising cooperating parts, one of which is fixed to one of said members, controllable means movable toward and from the other part for connecting it to the other member and for disconnecting it therefrom, and other controllable means for connecting and disconnecting the parts of said clutch.

3. The combination with a hollow shaft having a side recess therein, of a clutch mounted thereon comprising cooperating parts that are normally relatively movable, one of said parts being loosely located on the shaft over said recess and having a corresponding recess adapted to register with the shaft recess, controllable means for connecting and disconnecting the parts of said clutch, and a key slidable within said hollow shaft and having a portion thereof adapted in one position of the key to project through the shaft recess into the recessed clutch part, whereby said part is fixed to the shaft.

4. The combination with a shaft having a recess therein, of a clutch mounted thereon comprising cooperating parts that are normally relatively movable, controllable means for connecting and disconnecting the parts of said clutch, a key pivotally mounted in the shaft recess, and means accessible from one end of the shaft for swinging the key on its pivot into and out of engagement with a recess in one of said parts, whereby said part and shaft are connected and disconnected respectively.

5. The combination with a driving member and a driven member, of a clutch comprising cooperating parts, one part of which is a running fit on one of said members and may be connected to rotate therewith or may be disconnected to rotate thereon, the other part of which is secured to the other member, one of said parts being provided with a shoulder, a rotatable key carried by the other part, and means for rotating said key into engagement with said shoulder, whereby the parts of said clutch are rigidly connected.

6. The combination with a source of power and a driven shaft of a clutch between said source of power and said driven shaft, comprising cooperating parts respectively associated with said source of power and said shaft, the part associated with the source of power having an abutment thereon, a rotatable key associated with the other part and normally tending to connect the parts of said clutch by engagement with said abutment, a movable stop for engaging said rotatable key and disconnecting said clutch, means for withdrawing said stop, a pin for releasing said last means, and a cam carried by the driven shaft for actuating the pin.

7. A clutch comprising cooperating relatively movable parts, one of said parts being provided with a shoulder, a rotatable member carried by the other part, means for biasing said rotatable member into engagement with the shoulder, whereby the parts of the clutch are connected, a slidable member, a stop mounted thereon, means for moving the slidable member to bring the stop into position to engage and actuate said rotatable member after a single revolution of the clutch for releasing said clutch, and controllable adjustable means for moving the slidable member to withdraw said stop to permit the rotatable member to re-establish the connection between the parts of the clutch.

8. The combination with a shaft having a recess therein, of a clutch mounted thereon comprising cooperating parts that are normally relatively movable, controllable means for connecting and disconnecting the parts of the clutch, a key mounted in the shaft recess, means for moving the key longitudinally of the shaft, and cooperating means for bringing the key into engagement with a recess in one of said clutch parts during a movement of the key longitudinally of the shaft, whereby said part is fixed to the shaft.

9. The combination of a driving member and a driven member, a clutch for connecting the driving member and driven member, means for disengaging the clutch and stopping the driven member at the completion of a predetermined period of rotation of the driven member, and controllable means for permitting the driven member to be rotated independently of the parts of the clutch and driving member.

10. The combination with a power operated driving member, a driven member and a clutch interposed between said members comprising cooperating clutch parts and controllable means normally adapted to effect the connection of said clutch parts whereby the driven member is power actuated, of means operative only at a predetermined point in the cycle of operation of the driven member for actuating said controllable connecting means to disengage said clutch parts and arrest the operation of said driven member, and means independent of said controllable means for permitting said driven member to be turned over by hand independently of said power operated member.

EDWARD ERICKSON.